(12) United States Patent
Kanao et al.

(10) Patent No.: US 11,531,523 B2
(45) Date of Patent: Dec. 20, 2022

(54) CALCULATING DEVICE

(71) Applicant: KABUSHIKI KAISHA TOSHIBA, Tokyo (JP)

(72) Inventors: Taro Kanao, Kawasaki Kanagawa (JP); Hayato Goto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/401,192

(22) Filed: Aug. 12, 2021

(65) Prior Publication Data
US 2022/0236947 A1 Jul. 28, 2022

(30) Foreign Application Priority Data

Jan. 26, 2021 (JP) .............................. JP2021-010008
Jun. 4, 2021 (JP) .............................. JP2021-093979

(51) Int. Cl.
| | | |
|---|---|---|
| G06F 7/38 | (2006.01) | |
| G06N 10/00 | (2022.01) | |
| G06E 3/00 | (2006.01) | |
| G06F 15/00 | (2006.01) | |
| G06E 1/00 | (2006.01) | |
| G06G 7/00 | (2006.01) | |

(52) U.S. Cl.
CPC ............... *G06F 7/381* (2013.01); *G06E 1/00* (2013.01); *G06E 3/00* (2013.01); *G06F 15/00* (2013.01); *G06G 7/00* (2013.01); *G06N 10/00* (2019.01)

(58) Field of Classification Search
CPC .. G06F 7/381; G06E 1/00; G06E 3/00; G06N 10/00; G06G 7/00
USPC ................ 326/3, 4, 5; 706/10, 14; 505/162; 331/107 R
See application file for complete search history.

(56) References Cited

U.S. PATENT DOCUMENTS 10,262,276 B2 4/2019 Puri et al.
10,467,545 B2 * 11/2019 Harris .................... G06N 10/20
(Continued)

FOREIGN PATENT DOCUMENTS

JP 6530326 B2 6/2019

OTHER PUBLICATIONS

I. Goto, et al., "Universal Quantum Computation with a Nonlinear Oscillator Network," Physical Review, vol. 93, pp. 050301-1 to 050301-4 (2016).
(Continued)

*Primary Examiner* — Arnold M Kinkead
(74) *Attorney, Agent, or Firm* — Finnegan, Henderson, Farabow, Garrett & Dunner, LLP

(57) ABSTRACT

According to one embodiment, a calculating device includes a nonlinear oscillator. The nonlinear oscillator includes a circuit part including a first Josephson junction and a second Josephson junction, and a conductive member including a first terminal. An electrical signal is input to the first terminal. The electrical signal includes a first signal in a first operation. The first signal includes a first frequency component having a first frequency, and a second frequency component having a second frequency. The first frequency is 2 times an oscillation frequency of the nonlinear oscillator. An absolute value of a difference between the first frequency and the second frequency is not more than 0.3 times the first frequency.

18 Claims, 9 Drawing Sheets

(56) References Cited

U.S. PATENT DOCUMENTS

2017/0104493 A1 4/2017 Goto
2018/0017603 A1* 1/2018 Goto .................. G06N 10/00

OTHER PUBLICATIONS

A. Grimm, et al., "Stabilization and Operation of a Kerr-Cat Qubit," Nature, vol. 584, pp. 205-211 (2020).
S. Puri, et al., "Engineering the Quantum States of Light in a Kerr-Nonlinear Resonator by Two-Photon Driving," Nature Partner Journals Quantum Information, 7 pages (2017).
S. Puri, et al., "Bias-Preserving Gates with Stabilized Cat Quibits," Science Advances, vol. 6, 15 pages (2020).

* cited by examiner

CALCULATING DEVICE

CROSS-REFERENCE TO RELATED APPLICATIONS

This application is based upon and claims the benefit of priority from Japanese Patent Application No. 2021-010008, filed on Jan. 26, 2021, and Japanese Patent Application No. 2021-093979, filed on Jun. 4, 2021; the entire contents of which are incorporated herein by reference.

FIELD

Embodiments described herein relate generally to a calculating device.

BACKGROUND

For example, a calculating device that utilizes multiple quantum nonlinear oscillators has been proposed. It is desirable for the calculating device to be faster.

DETAILED DESCRIPTION

Figure 1:
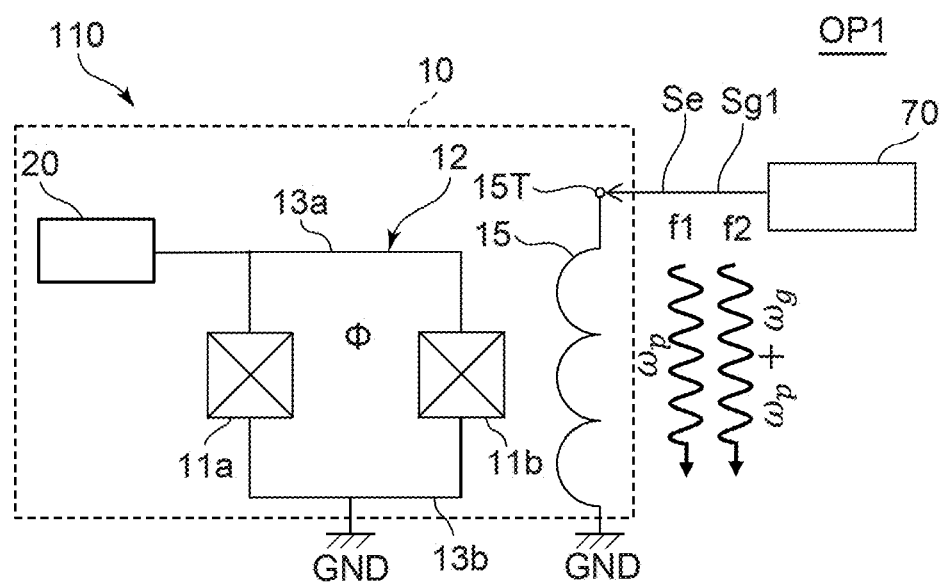
FIG. 1 is a schematic view illustrating a calculating device according to a first embodiment.

According to one embodiment, a calculating device includes a nonlinear oscillator. The nonlinear oscillator includes a circuit part including a first Josephson junction and a second Josephson junction, and a conductive member including a first terminal. An electrical signal is input to the first terminal. The electrical signal includes a first signal in a first operation. The first signal includes a first frequency component having a first frequency, and a second frequency component having a second frequency. The first frequency is 2 times an oscillation frequency of the nonlinear oscillator. An absolute value of a difference between the first frequency and the second frequency is not more than 0.3 times the first frequency.

According to one embodiment, a calculating device includes a nonlinear oscillator. The nonlinear oscillator includes a circuit part including a first Josephson junction and a second Josephson junction, and a conductive member including a first terminal. An electrical signal is input to the first terminal. The electrical signal includes a first signal in a first operation. The first signal includes a first frequency component having a first frequency, and a second frequency component having a second frequency. The first frequency is 2 times an oscillation frequency of the nonlinear oscillator. An absolute value of a difference between the first frequency and the second frequency is not more than 30 times a frequency corresponding to a Kerr coefficient of the nonlinear oscillator.

According to one embodiment, a calculating device includes a nonlinear oscillator. The nonlinear oscillator includes a circuit part including a first Josephson junction and a second Josephson junction, and a conductive member including a first terminal. An electrical signal is input to the first terminal. The electrical signal includes a first signal in a first operation. The first signal includes a first frequency component having a first frequency, and a second frequency component having a second frequency. An absolute value of a difference between the first frequency and the second frequency corresponds to a frequency corresponding to a difference between an energy of a ground state of the nonlinear oscillator and an energy of an excited state of the nonlinear oscillator.

According to one embodiment, a calculating device includes a nonlinear oscillator, and a signal generator. The nonlinear oscillator includes a circuit part including a first Josephson junction and a second Josephson junction, and a conductive member including a first terminal. The signal generator is configured to apply an electrical signal to the first terminal. The electrical signal is input to the first terminal. The electrical signal includes a first signal in a first operation. The first signal includes a first frequency component having a first frequency, and a second frequency component having a second frequency. The signal generator includes a first circuit configured to generate a first frequency signal of the first frequency, a second circuit configured to generate a difference frequency signal of a frequency of a difference between the first frequency and the second frequency, and a third circuit configured to mix the first frequency signal and the difference frequency signal.

According to one embodiment, a calculating device includes a nonlinear oscillator, and a signal generator. The nonlinear oscillator includes a circuit part including a first Josephson junction and a second Josephson junction, and a conductive member including a first terminal. The signal generator is configured to apply an electrical signal to the first terminal. The electrical signal is input to the first terminal. The electrical signal includes a first signal in a first operation. The first signal includes a first frequency component having a first frequency, and a second frequency component having a second frequency. The signal generator includes a first circuit, a second circuit, and a third circuit. The first circuit is configured to generate a first frequency signal of the first frequency. The second circuit is configured to generate a difference frequency signal of a frequency of a difference between the first frequency and the second frequency, and a quadrature signal with respect to the difference frequency signal. The third circuit is configured to mix the first frequency signal, the difference frequency signal, and the quadrature signal.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic view illustrating a calculating device according to a first embodiment.

As shown in FIG. 1, the calculating device 110 according to the embodiment includes a nonlinear oscillator 10. The nonlinear oscillator 10 includes a circuit part 12 and a conductive member 15.

The circuit part 12 includes a first Josephson junction 11a and a second Josephson junction 11b. For example, the circuit part 12 further includes a first conductive part 13a and a second conductive part 13b. The first Josephson junction 11a and the second Josephson junction 11b are connected by the first and second conductive parts 13a and 13b. The first Josephson junction 11a and the second Josephson junction 11b are connected in parallel. For example, the second conductive part 13b is electrically connected to a ground part GND. The circuit part 12 is, for example, a dc SQUID.

The conductive member 15 includes a first terminal 15T. For example, the first terminal 15T corresponds to one end of the conductive member 15. The other end of the conductive member 15 is electrically connected to the ground part GND.

An electrical signal Se is applied to the first terminal 15T. The electrical signal Se is, for example, a microwave pulse.

For example, the electrical signal Se is input from a signal generator 70 to the first terminal 15T. The calculating device 110 may include the signal generator 70. The signal generator 70 is configured to apply the electrical signal Se to the first terminal 15T. Examples of the signal generator 70 are described below.

In one operation (a first operation OP1), the electrical signal Se includes a first signal Sg1. The first signal includes a first frequency component that has a first frequency f1, and a second frequency component that has a second frequency f2. The first frequency f1 is, for example, substantially 2 times the oscillation frequency of the nonlinear oscillator 10.

For example, the frequency can be represented by an angular frequency "$\omega_p$," and an angular frequency "$\omega_p+\omega_g$". The first frequency f1 corresponds to $\omega_p/(2\pi)$. The second frequency f2 corresponds to $(\omega_p+\omega_g)/(2\pi)$. The frequency fg corresponds to $\omega_g/(2\pi)$. In one example, $\omega_p/(2\pi)$ is 20 GHz. In one example, $\omega_g/(2\pi)$ is 0.1 GHz. "$\pi$" is pi.

The electrical signal Se that includes such a first signal Sg1 is input to one terminal (the first terminal 15T).

By supplying the electrical signal Se to the conductive member 15, a magnetic field $\Phi$ (a magnetic flux) that is generated from the conductive member 15 is applied to the circuit part 12. The oscillation state of the circuit part 12 can be controlled by applying the first signal Sg1 that includes the first and second frequency components to the conductive member 15.

For example, the nonlinear oscillator 10 corresponds to a Kerr-nonlinear parametric oscillator (KPO). A KPO bifurcation phenomenon is utilized in the calculating device 110. The calculating device 110 is, for example, a quantum computing device.

As shown in FIG. 1, the nonlinear oscillator 10 may further include a resonator 20. For example, the resonator 20 is connected with the circuit part 12. In the example, the resonator 20 is connected to the first conductive part 13a. For example, the oscillation state of the nonlinear oscillator 10 can be detected by detecting (measuring) the state of the resonator 20.

According to the embodiment, an excited state can be utilized by applying the first signal Sg1 that includes the first frequency component having the first frequency f1 and the second frequency component having the second frequency f2. For example, an "X-rotation gate operation" can be performed.

Generally, ground states are used in a calculating device that uses a dc SQUID. For example, the ground states are $|\alpha\rangle$ and $|-\alpha\rangle$. These states are coherent states. For example, these states are utilized as the qubits $|0\rangle$ and $|1\rangle$. For example, a transition between $|\alpha\rangle$ and $|-\alpha\rangle$ is performed by an X-rotation gate operation of the KPO.

For example, a reference example may be considered in which the X-rotation gate operation is performed by controlling the magnetic field $\Phi$. In the reference example, it is necessary to add a conductive member (a transmission line). For example, in a general reference example, states that are limited to $|\alpha\rangle$ and $|-\alpha\rangle$ are utilized. For example, in the reference example, the microwave of one frequency ($\omega_p$) is utilized.

Conversely, according to the embodiment, the first signal Sg1 that includes multiple frequency components is applied to the conductive member 15. Thereby, the transition between $|\alpha\rangle$ and $|-\alpha\rangle$ is easy. For example, the X-rotation gate operation can be quickly performed. According to the embodiment, the calculating device can be faster. Examples of the change (the transition) of the states of the embodiment are described below.

Figure 2A:
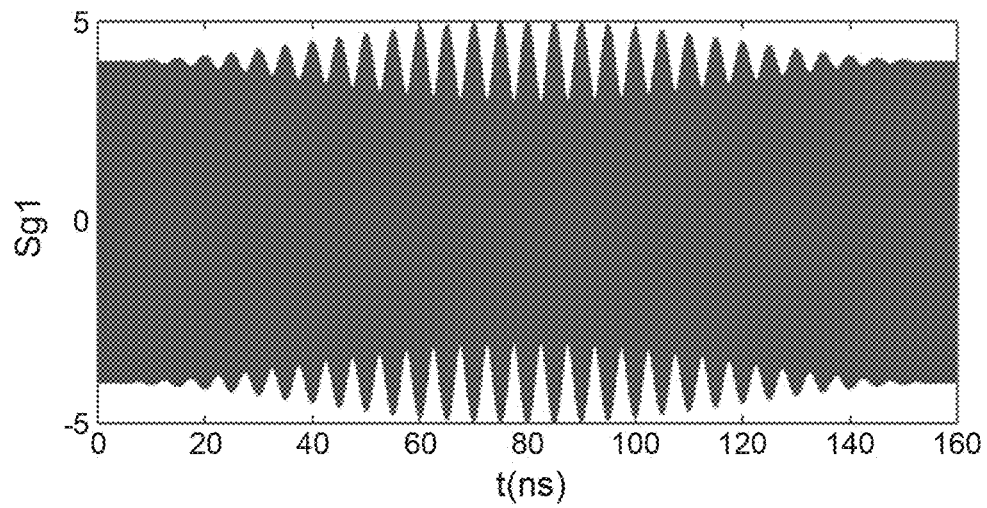
FIGS. 2A and 2B are schematic views illustrating the calculating device according to the first embodiment.
Figure 2B:
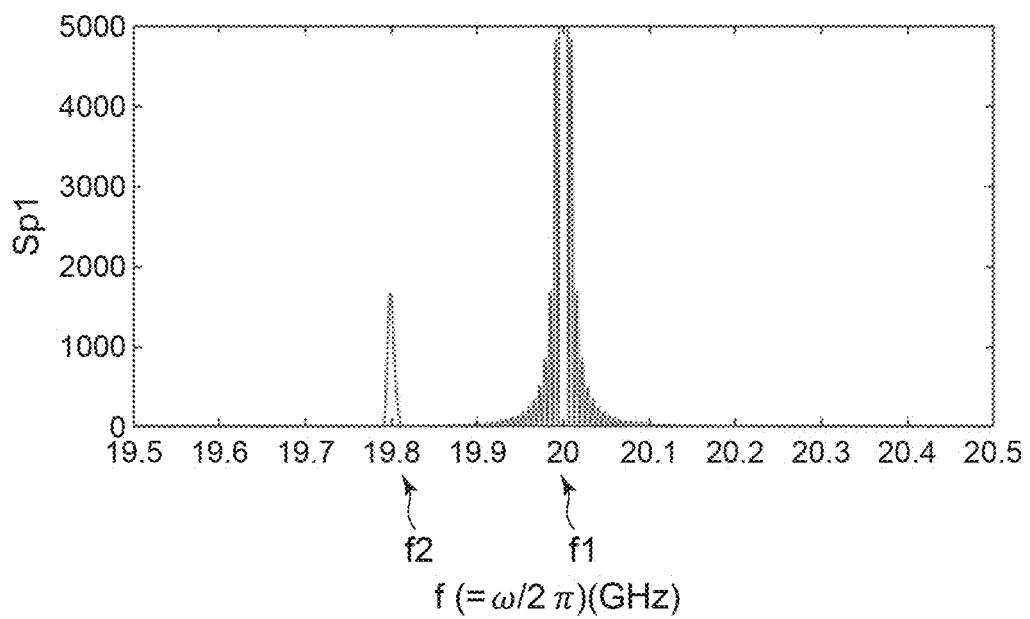

FIGS. 2A and 2B are schematic views illustrating the calculating device according to the first embodiment. The horizontal axis of FIG. 2A is a time t. The vertical axis of FIG. 2A is the first signal Sg1 (arbitrary units). As shown in FIG. 2A, the first signal Sg1 changes with the time t.

FIG. 2B illustrates the spectrum of such a first signal Sg1. The horizontal axis of FIG. 2B is a frequency f. The frequency f is $\omega/(2\pi)$. The vertical axis of FIG. 2B is an intensity Sp1 of the spectrum (arbitrary units). As shown in FIG. 2B, the intensity Sp1 of the spectrum includes two independent peaks. The intensity Sp1 of the spectrum includes, for example, the first frequency component that has the first frequency f1, and the second frequency component that has the second frequency f2. In the example, the first frequency f1 is 20 GHz. The second frequency f2 is 19.8 GHz. For example, $\omega_p/(2\pi)$ corresponds to 20 GHz. For example, $\omega_g/(2\pi)$ corresponds to −0.2 GHz. By using such a first signal Sg1, the X-rotation gate operation can be quickly performed.

For example, a signal waveform f(t) that corresponds to the first signal Sg1 is represented by the following first formula.

$$F(t) = A_p\cos(\omega_p t) + A_g\sin^2\left(\frac{\pi t}{T_g}\right)\cos[(\omega_p + \omega_g)t] \quad (1)$$

For example, a spectrum $S(\omega)$ that corresponds to the intensity Sp1 of the spectrum is represented by the following second formula.

$$S(\omega)=|\int_{-\infty}^{\infty} dt e^{-i\omega t} f(t)|^2 \qquad (2)$$

In one example, a coefficient Ap is 4. For example, a coefficient Ag is 1. For example, "$T_g$" is 160 ns.

For example, the second frequency f2 is less than the first frequency f1.

Figure 3:
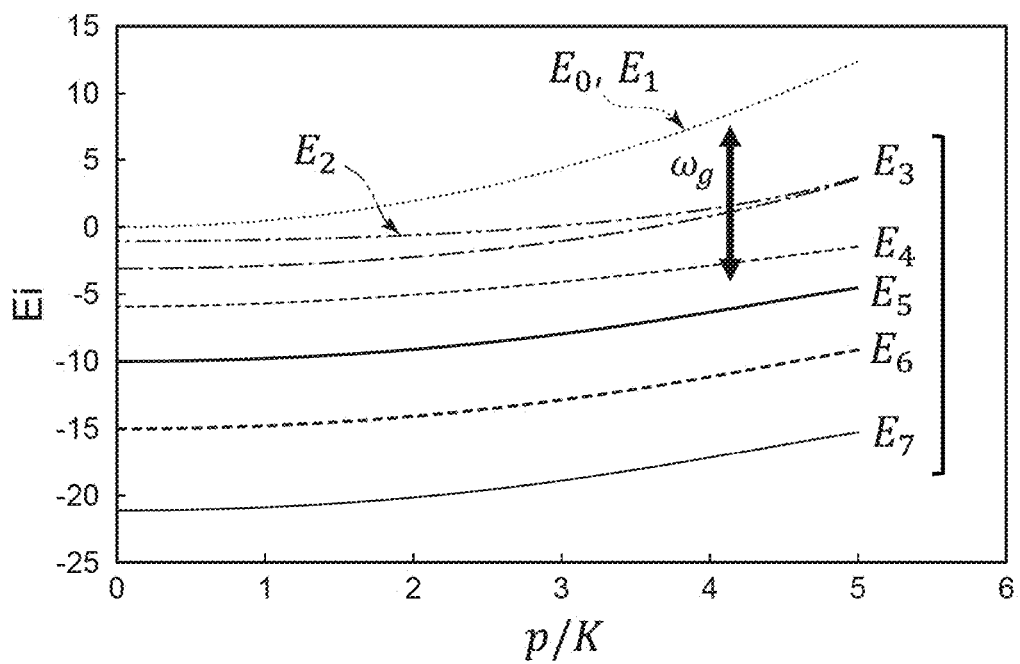
FIG. 3 is a schematic view illustrating states of the calculating device according to the first embodiment.

FIG. 3 is a schematic view illustrating states of the calculating device according to the first embodiment.

The horizontal axis of FIG. 3 is a ratio p/K. "p" is the pumping amplitude of the KPO. "K" is the Kerr coefficient of the KPO. The vertical axis is an energy eigenvalue Ei. The Kerr coefficient K corresponds to the anharmonicity of the nonlinear oscillator 10. For example, the anharmonicity can be derived from the spectrum when the pumping amplitude p is 0. For example, $K/(2\pi)=f12-f01$ holds. "f01" corresponds to a frequency that corresponds to the excitation from a "vacuum" to a "single-photon state". "f12" is a frequency that corresponds to the excitation from a "single-photon state" to a "two-photon state".

Energies $E_0$ and $E_1$ shown in FIG. 3 correspond to the ground states $|\alpha\rangle$ and $|-\alpha\rangle$. Other energies $E_2$ to $E_7$, etc., exist as shown in FIG. 3. The other energies $E_2$ to $E_7$ correspond to excited states. Generally, the energies $E_0$ and $E_1$ that correspond to the ground states are utilized. In such a case, the design is performed so that transitions to excited states do not occur.

Conversely, according to the embodiment, a transition from a ground state to an excited state is utilized. The transition is performed by utilizing "$\omega_g$". For example, the conductive member 15 functions as a transmission path for two-photon excitation.

Examples of operations of the calculating device 110 according to the embodiment will now be described.

Figure 4A:
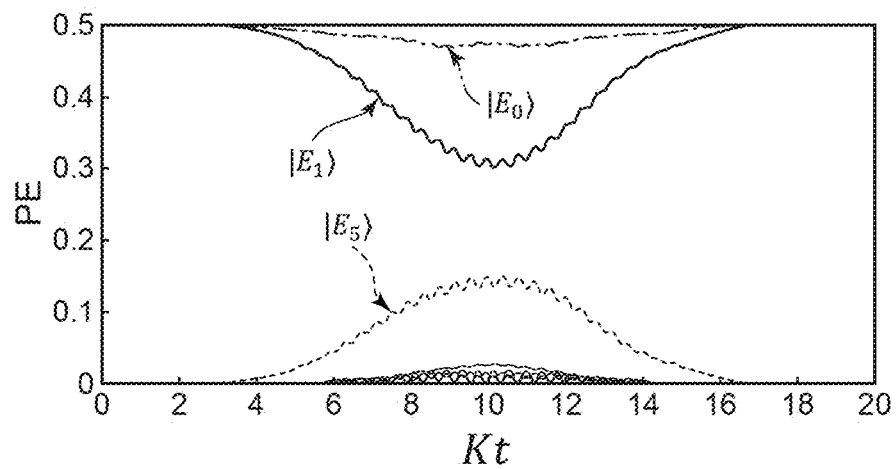
FIGS. 4A and 4B are schematic views illustrating operations of the calculating device according to the first embodiment.
Figure 4B:
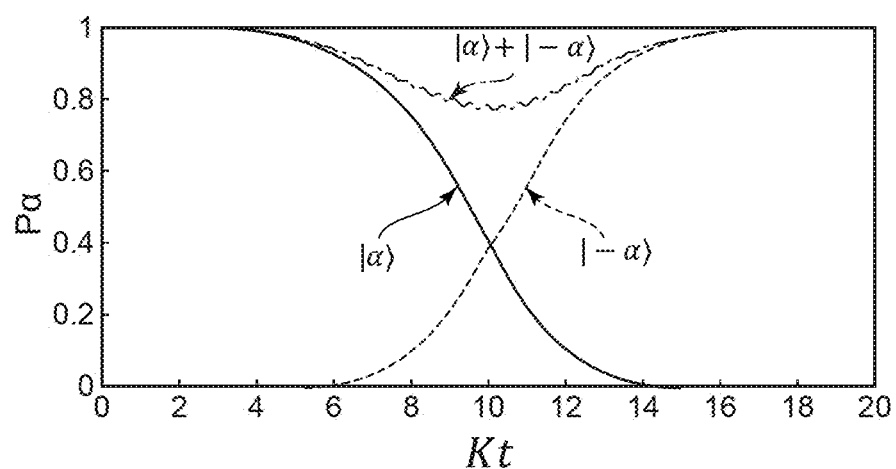

FIGS. 4A and 4B are schematic views illustrating operations of the calculating device according to the first embodiment.

In these figures, the horizontal axis is a time Kt. The vertical axis of FIG. 4A is a probability PE of the multiple eigenstates. The vertical axis of FIG. 4B is a probability $P\alpha$ of $|\alpha\rangle$, $|-\alpha\rangle$, and the sum of $|\alpha\rangle$ and $|-\alpha\rangle$.

As shown in FIG. 4A, a transition between ground and excited states (e.g., a transition between the energy $E_1$ and the energy $E_5$) can be utilized.

As shown in FIG. 4B, a transition from $|\alpha a\rangle$ to $|-\alpha\rangle$ is possible. For example, a fidelity F is 0.999091 when the gate time $K \cdot T_g$ is 20. $|\langle E_0|\psi\rangle|^2+|\langle E_1|\psi\rangle|^2$ is 0.99936.

Figure 5:
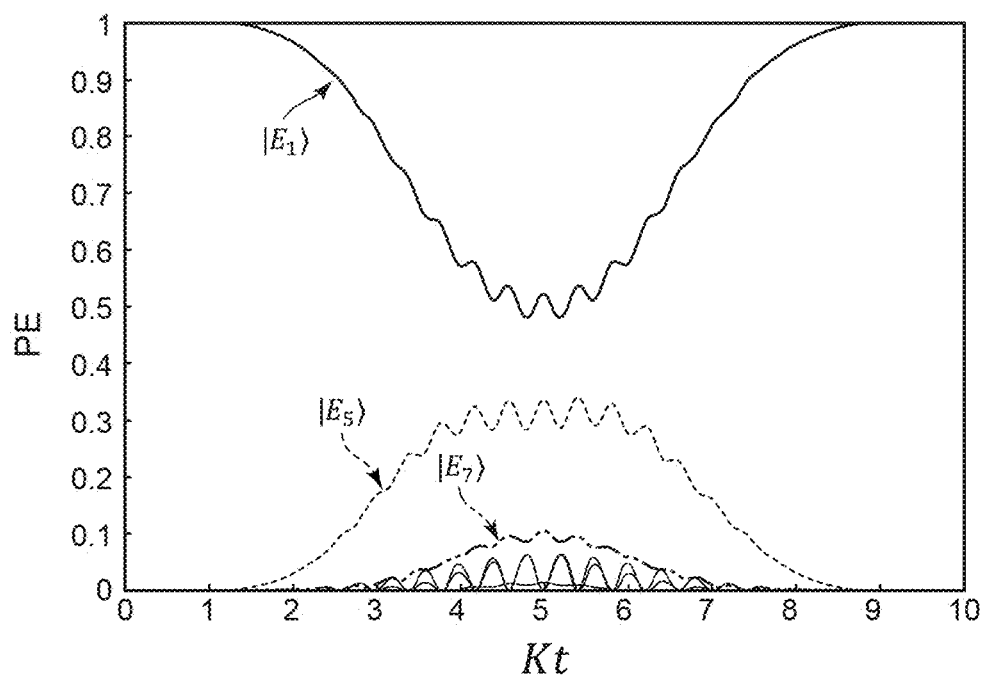
FIG. 5 is a schematic view illustrating an operation of the calculating device according to the first embodiment.

FIG. 5 is a schematic view illustrating an operation of the calculating device according to the first embodiment.

In FIG. 5, the eigenstate $|E_1\rangle$ in the initial state is taken to be $(|\alpha\rangle-|-\alpha\rangle)/2^{1/2}$. The horizontal axis of FIG. 5 is the time Kt. The vertical axis of FIG. 5 is the probability PE of the multiple eigenstates.

In FIG. 5 as well, a transition between mutually-separated levels (e.g., a transition between the energy $E_1$ and the energy $E_5$) can be utilized. For example, $|\langle E_1|\psi\rangle|^2$ is 0.999503 when the gate time $K \cdot T_g$ is 10. $\arg(\langle E_1|\psi\rangle)/\pi$ is 0.999477.

As described above, the first frequency f1 is set to 2 times the oscillation frequency of the nonlinear oscillator 10. The oscillation states of the nonlinear oscillator 10 include a first oscillation state, a second oscillation state, and a third oscillation state. The first oscillation state and the second oscillation state are, for example, states that corresponds to the ground states. The third oscillation state is, for example, a state of the other energies $E_2$ to $E_7$ or the like. According to the embodiment as described above, the electrical signal Se that includes the first signal Sg1 that includes the first frequency component having the first frequency f1 and the second frequency component having the second frequency f2 is input to the first terminal 15T. The oscillation state of the nonlinear oscillator 10 is changed thereby.

For example, in the first operation OP1 as shown in FIG. 4B, the ratio of the occurrence probability of the first oscillation state to the occurrence probability of the second oscillation state changes. In other words, the X-rotation gate operation is easily performed. The ratio of the occurrence probability of the first oscillation state to the occurrence probability of the second oscillation state is changeable according to the second frequency component.

According to the embodiment, a transition from the $|\alpha\rangle$ state to the $|-\alpha\rangle$ state or a transition from the $|-\alpha\rangle$ state to the $|\alpha\rangle$ state may be performed. For example, the first oscillation state corresponds to one of the $|\alpha\rangle$ state or the $|-\alpha\rangle$ state. For example, the second oscillation state corresponds to the other of the $|\alpha\rangle$ state or the $|-\alpha\rangle$ state.

According to the embodiment as described below, other operations may be performed in addition to the first operation OP1 described above.

Figure 6:
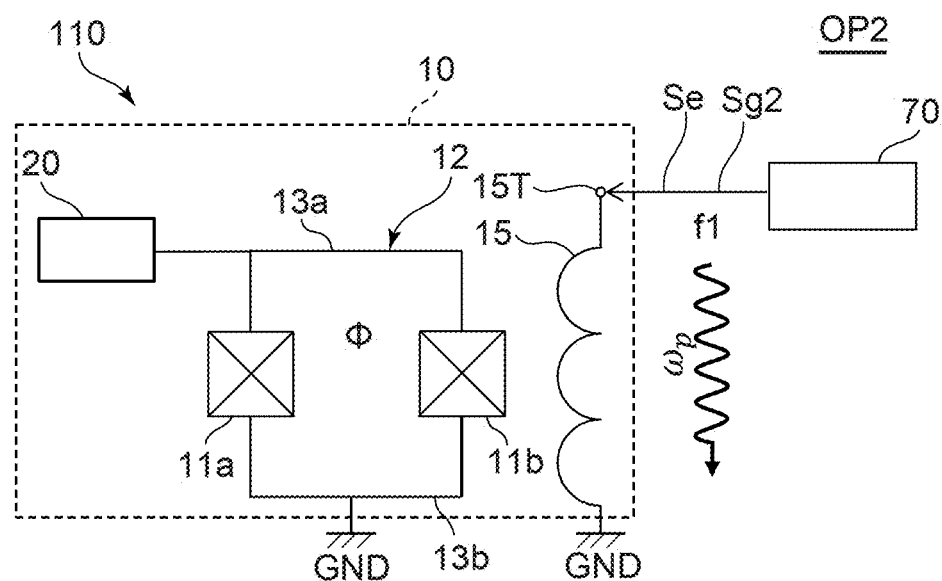
FIG. 6 is a schematic view illustrating the calculating device according to the first embodiment.

FIG. 6 is a schematic view illustrating the calculating device according to the first embodiment.

FIG. 6 illustrates a second operation OP2. In the second operation OP2, the electrical signal Se includes a second signal Sg2 that includes the first frequency component. The second signal Sg2 substantially does not include the second frequency component. In such a case, an X-rotation gate operation is not performed. In such a case as well, the first frequency f1 is substantially 2 times the oscillation frequency of the nonlinear oscillator 10. In the second operation OP2 as well, the oscillation states of the nonlinear oscillator 10 include the first and second oscillation states. The ratio of the occurrence probability of the first oscillation state to the occurrence probability of the second oscillation state in the second operation OP2 is different from the ratio of the occurrence probability of the first oscillation state to the occurrence probability of the second oscillation state in the first operation OP1. For example, an operation that is different from the first operation OP1 regarding the X-rotation gate operation may be performed as the second operation OP2.

Figure 7:
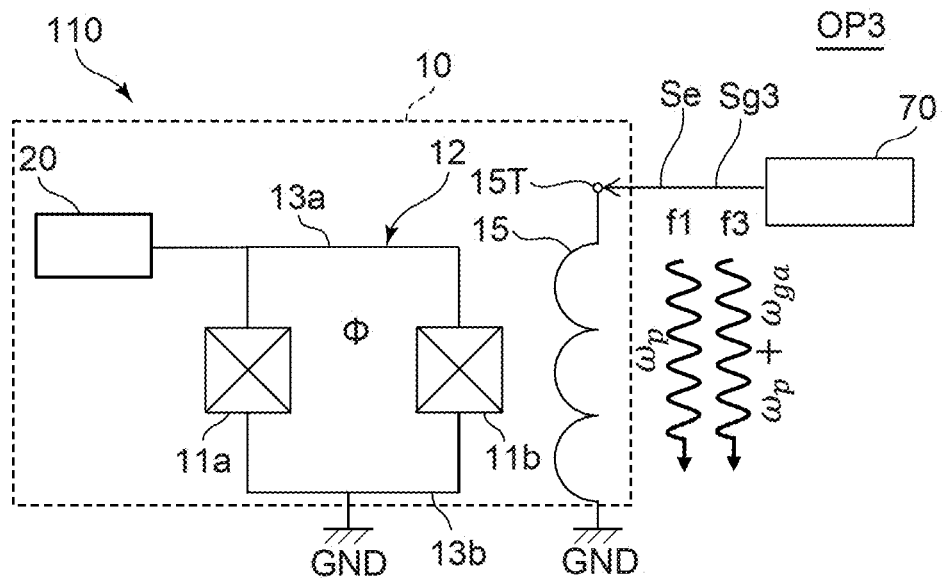
FIG. 7 is a schematic view illustrating the calculating device according to the first embodiment.

FIG. 7 is a schematic view illustrating the calculating device according to the first embodiment.

FIG. 7 illustrates a third operation OP3. In the third operation OP3, the electrical signal Se includes a third signal Sg3. The third signal Sg3 includes the first frequency component that has the first frequency f1, and a third frequency component that has a third frequency f3. The third frequency f3 corresponds to $(\omega_p+\omega_{ga})/(2\pi)$. "$\omega_{ga}$" is different from "$\omega_g$". The third frequency f3 is different from the second frequency f2. The third signal Sg3 that includes such a third frequency component may be used.

In such a third operation as well, the first frequency f1 is set to be substantially 2 times the oscillation frequency of the nonlinear oscillator 10. The oscillation states of the nonlinear oscillator 10 include the first and second oscillation states. The ratio of the occurrence probability of the first oscillation state to the occurrence probability of the second oscillation state in the third operation OP3 is different from the ratio of the occurrence probability of the first oscillation state to the occurrence probability of the second oscillation state in the first operation OP1. Such a third operation OP3 may be performed.

Figure 8:
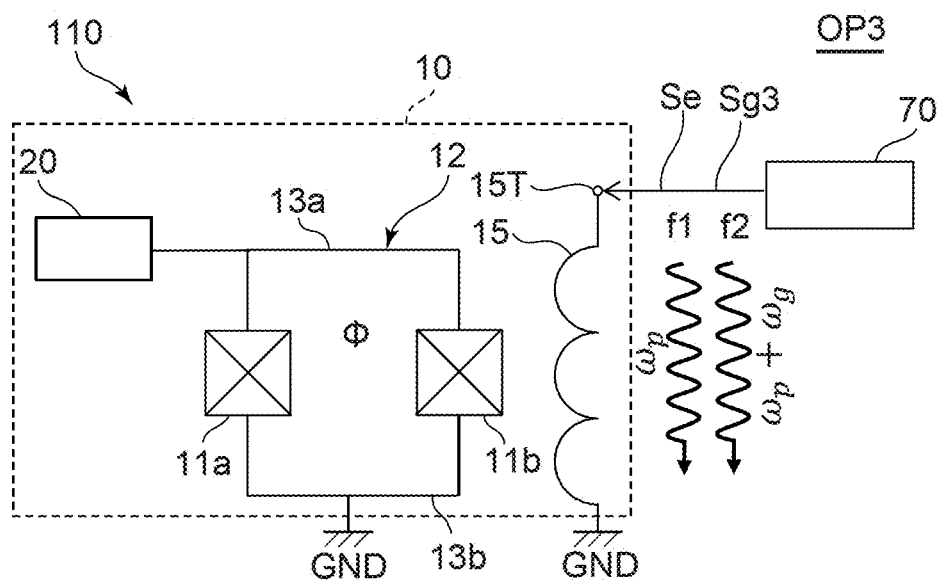
FIG. 8 is a schematic view illustrating the calculating device according to the first embodiment.

FIG. 8 is a schematic view illustrating the calculating device according to the first embodiment.

FIG. 8 illustrates the third operation OP3. In the third operation OP3, the electrical signal Se includes the third signal Sg3. In the third operation OP3, the third signal Sg3 includes the first frequency component that has the first frequency f1, and the third frequency component that has the second frequency f2. The magnitude of the third frequency component in the third operation OP3 is different from the magnitude of the second frequency component in the first operation OP1 described above. For example, the frequency (the second frequency f2) of the third frequency component in the third operation OP3 is equal to the frequency (the second frequency f2) of the second frequency component in the first operation OP1. The third signal Sg3 that includes a third frequency component that has the same frequency and a different magnitude may be used.

In the third operation OP3 illustrated in FIG. 8 as well, the first frequency f1 is set to be substantially 2 times the oscillation frequency of the nonlinear oscillator 10. The oscillation states of the nonlinear oscillator 10 include the first and second oscillation states. The ratio of the occurrence probability of the first oscillation state to the occurrence probability of the second oscillation state in the third operation OP3 illustrated in FIG. 8 is different from the ratio of the occurrence probability of the first oscillation state to the occurrence probability of the second oscillation state in the first operation OP1 illustrated in FIG. 1. Thus, the oscillation state can be easily modified by modifying the magnitude of the frequency component that has the second frequency f2.

Figure 9A:
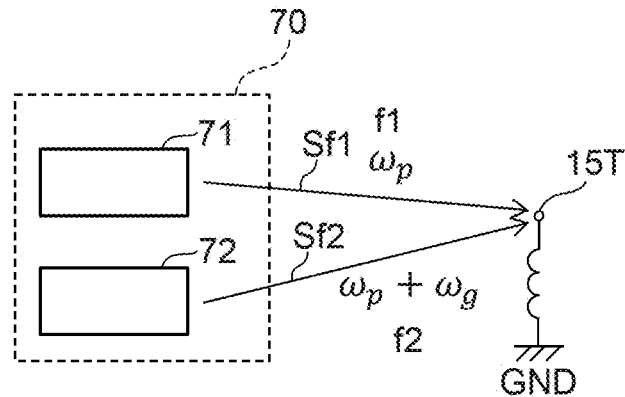
FIGS. 9A to 9C are schematic views illustrating a portion of the calculating device according to the first embodiment.
Figure 9B:
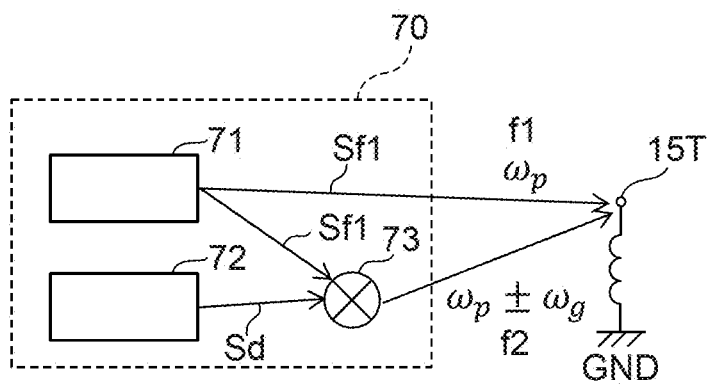
Figure 9C:
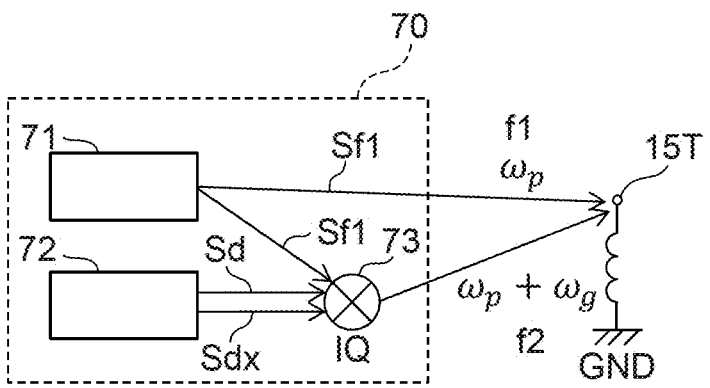

FIGS. 9A to 9C are schematic views illustrating a portion of the calculating device according to the first embodiment.

As shown in FIG. 9A, the signal generator 70 includes a first circuit 71 and a second circuit 72. The first circuit 71 is configured to generate a first frequency signal Sf1 of the first frequency f1. The second circuit 72 is configured to generate a second frequency signal Sf2 of the second frequency f2.

As shown in FIG. 9B, the signal generator 70 may include the first circuit 71, the second circuit 72, and a third circuit 73. The first circuit 71 is configured to generate the first frequency signal Sf1 of the first frequency f1. The second circuit 72 is configured to generate a difference frequency signal Sd of a frequency of the difference between the first frequency f1 and the second frequency f2. The frequency of the difference corresponds to $\omega_g/(2\pi)$. The third circuit 73 is configured to mix the first frequency signal Sf1 and the difference frequency signal Sd. A signal of the second frequency f2 $((\omega_p \pm \omega_g)/(2\pi))$ is output from the third circuit 73.

As shown in FIG. 9C, the signal generator 70 may include the first circuit 71, the second circuit 72, and the third circuit 73. The first circuit 71 is configured to generate the first frequency signal Sf1 of the first frequency f1. The second circuit 72 is configured to generate the difference frequency signal Sd of the frequency of the difference between the first frequency f1 and the second frequency f2, and a signal Sdx that is of the same phase and orthogonal to the difference frequency signal Sd. The third circuit 73 is configured to mix the first frequency signal Sf1 and the difference frequency signal Sd. A signal of the second frequency f2 $((\omega_p + \omega_g)/(2\pi))$ is output from the third circuit 73.

Figure 10:
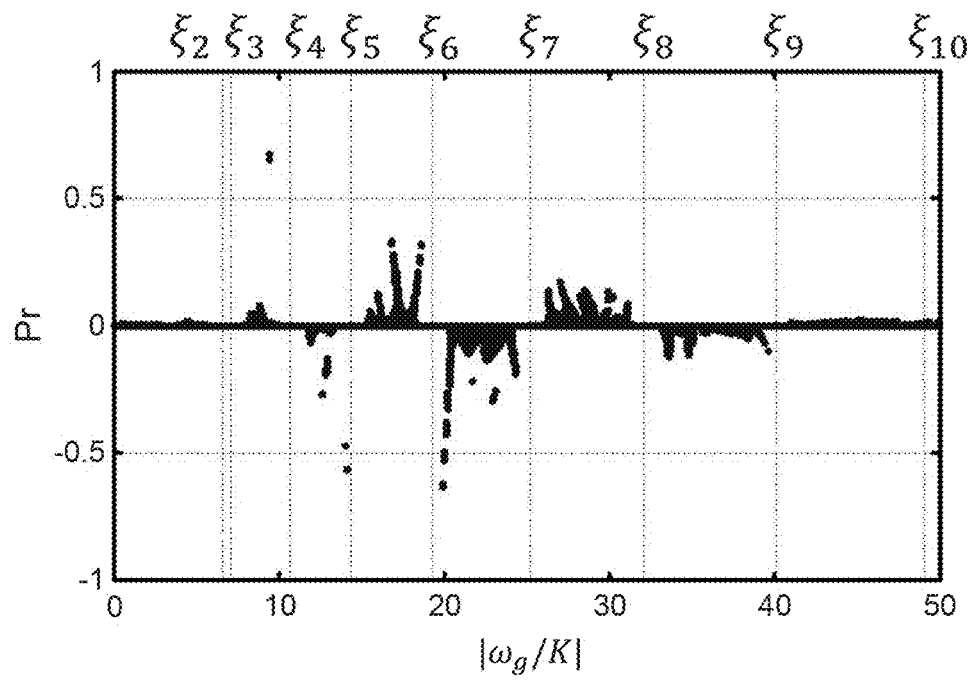
FIG. 10 is a graph illustrating a characteristic of the calculating device.

FIG. 10 is a graph illustrating a characteristic of the calculating device.

FIG. 10 illustrates simulation results of the rotation angle (the rotation phase) of the rotation gate operation utilizing the excited states. The horizontal axis of FIG. 10 is a ratio $|\omega_g/K|$. The vertical axis is a rotation phase Pr. The rotation phase Pr corresponds to $\theta/\pi$, wherein when the rotation angle is $\theta$. In the example, the initial state is $(|E_0\rangle + |E_1\rangle)/2^{1/2}$ and substantially corresponds to $|\alpha\rangle$. A difference $\xi_n$ corresponds to $|E_n - E_0|/(hK/(2\pi))$. "h" is the Planck's constant. $\xi_0$ and $\xi_1$ are 0. In the example of FIG. 10, p/K is 4; and $K \cdot T_g$ is 10.

As shown in FIG. 10, rotations that correspond to differences $\xi_2$ to $\xi_{10}$ occur as the ratio $|\omega_g/K|$ increases. The fidelity F is greater than 0.999 in X-rotation gate operations Rx($\theta$).

According to the embodiment, it is favorable for the absolute value of the difference between the first frequency f1 and the second frequency f2 to be, for example, not less than 5 times and not more than 30 times the Kerr coefficient of the nonlinear oscillator 10. For example, as shown in FIG. 10, a large rotation phase Pr is obtained with high fidelity when the absolute value of the difference ($\omega_g/(2\pi)$) between the first frequency f1 and the second frequency f2 is not less than 0 times (e.g., not less than 5 times) and not more than 30 times the Kerr coefficient K.

According to the embodiment as described above, the first frequency f1 can be set to be 2 times the oscillation frequency of the nonlinear oscillator 10. It is favorable for the absolute value of the difference between the first frequency f1 and the second frequency f2 to be, for example, greater than 0 times and not more than 0.3 times the first frequency f1. For example, for the range of the ratio $|\omega_g/K|$ in which a large rotation phase is obtained as shown in FIG. 10, a large rotation phase is obtained with high fidelity when the absolute value of the difference ($\omega_g/(2\pi)$) between the first frequency f1 and the second frequency f2 is greater than 0 times (e.g., not less than 0.05 times) and not more than 0.3 times the first frequency f1. For example, K/($2\pi$) may be estimated to be substantially 1/100 of the first frequency f1.

For example, the absolute value of the difference between the first frequency f1 and the second frequency f2 may correspond to the absolute value of the difference between a ground state and an excited state of the nonlinear oscillator 10.

Embodiments may include the following configurations (e.g., technological proposals).

Configuration 1

A calculating device, comprising:
  a nonlinear oscillator including
    a circuit part including a first Josephson junction and a second Josephson junction, and
    a conductive member including a first terminal,
    an electrical signal being input to the first terminal,
  the electrical signal including a first signal in a first operation,
    the first signal including
    a first frequency component having a first frequency, and
    a second frequency component having a second frequency,
    the first frequency being 2 times an oscillation frequency of the nonlinear oscillator,
    an absolute value of a difference between the first frequency and the second frequency being not more than 0.3 times the first frequency.

Configuration 2

The calculating device according to Configuration 1, wherein
  the absolute value of the difference between the first frequency and the second frequency is not more than 30 times a frequency corresponding to a Kerr coefficient of the nonlinear oscillator.

Configuration 3
A calculating device, comprising:
a nonlinear oscillator including
a circuit part including a first Josephson junction and a second Josephson junction, and
a conductive member including a first terminal,
an electrical signal being input to the first terminal,
the electrical signal including a first signal in a first operation,
the first signal including
a first frequency component having a first frequency, and
a second frequency component having a second frequency,
the first frequency being 2 times an oscillation frequency of the nonlinear oscillator,
an absolute value of a difference between the first frequency and the second frequency being not more than 30 times a frequency corresponding to a Kerr coefficient of the nonlinear oscillator.

Configuration 4
The calculating device according to any one of Configurations 1 to 3, wherein
the absolute value of the difference between the first frequency and the second frequency corresponds to a frequency corresponding to a difference between an energy of a ground state of the nonlinear oscillator and an energy of an excited state of the nonlinear oscillator.

Configuration 5
A calculating device, comprising:
a nonlinear oscillator including
a circuit part including a first Josephson junction and a second Josephson junction, and
a conductive member including a first terminal,
an electrical signal being input to the first terminal,
the electrical signal including a first signal in a first operation,
the first signal including
a first frequency component having a first frequency, and
a second frequency component having a second frequency,
an absolute value of a difference between the first frequency and the second frequency corresponding to a frequency corresponding to a difference between an energy of a ground state of the nonlinear oscillator and an energy of an excited state of the nonlinear oscillator.

Configuration 6
The calculating device according to any one of Configurations 1 to 5, wherein
the first frequency is 2 times the oscillation frequency of the nonlinear oscillator,
oscillation states of the nonlinear oscillator include a first oscillation state and a second oscillation state, and
a ratio of an occurrence probability of the first oscillation state to an occurrence probability of the second oscillation state changes according to the second frequency component in the first operation.

Configuration 7
The calculating device according to any one of Configurations 1 to 5, wherein
the electrical signal includes a second signal in a second operation, and
the second signal includes the first frequency component.

Configuration 8
The calculating device according to Configuration 7, wherein
the first frequency is 2 times the oscillation frequency of the nonlinear oscillator,
oscillation states of the nonlinear oscillator include a first oscillation state and a second oscillation state, and
a ratio of an occurrence probability of the first oscillation state to an occurrence probability of the second oscillation state in the second operation is different from a ratio of an occurrence probability of the first oscillation state to an occurrence probability of the second oscillation state in the first operation.

Configuration 9
The calculating device according to any one of Configurations 1 to 5, wherein
the electrical signal includes a third signal in a third operation,
the third signal includes
the first frequency component, and
a third frequency component having a third frequency, and
the third frequency is different from the second frequency.

Configuration 10
The calculating device according to Configuration 9, wherein
the first frequency is 2 times the oscillation frequency of the nonlinear oscillator,
oscillation states of the nonlinear oscillator include a first oscillation state and a second oscillation state, and
a ratio of an occurrence probability of the first oscillation state to an occurrence probability of the second oscillation state in the third operation is different from a ratio of an occurrence probability of the first oscillation state to an occurrence probability of the second oscillation state in the first operation.

Configuration 11
The calculating device according to any one of Configurations 1 to 5, wherein
the electrical signal includes a third signal in a third operation,
the third signal includes
the first frequency component, and
a third frequency component having the second frequency, and
a magnitude of the third frequency component is different from a magnitude of the second frequency component.

Configuration 12
The calculating device according to Configuration 11, wherein
the first frequency is 2 times the oscillation frequency of the nonlinear oscillator,
oscillation states of the nonlinear oscillator include a first oscillation state and a second oscillation state, and
a ratio of an occurrence probability of the first oscillation state to an occurrence probability of the second oscillation state in the third operation is different from a ratio of an occurrence probability of the first oscillation state to an occurrence probability of the second oscillation state in the first operation.

Configuration 13
The calculating device according to any one of Configurations 1 to 12, wherein
the second frequency is less than the first frequency.

Configuration 14
The calculating device according to any one of Configurations 1 to 13, further comprising:
a signal generator configured to apply the electrical signal to the first terminal.

Configuration 15
The calculating device according to Configuration 14, wherein
the signal generator includes:
a first circuit configured to generate a first frequency signal of the first frequency; and
a second circuit configured to generate a second frequency signal of the second frequency.

Configuration 16
The calculating device according to Configuration 14, wherein
the signal generator includes:
a first circuit configured to generate a first frequency signal of the first frequency;
a second circuit configured to generate a difference frequency signal of a frequency of a difference between the first frequency and the second frequency; and
a third circuit configured to mix the first frequency signal and the difference frequency signal.

Configuration 17
The calculating device according to Configuration 14, wherein
the signal generator includes a first circuit, a second circuit, and a third circuit,
the first circuit is configured to generate a first frequency signal of the first frequency,
the second circuit is configured to generate:
a difference frequency signal of a frequency of a difference between the first frequency and the second frequency; and
a quadrature signal with respect to the difference frequency signal, and
the third circuit is configured to mix the first frequency signal, the difference frequency signal, and the quadrature signal.

Configuration 18
A calculating device, comprising:
a nonlinear oscillator including
a circuit part including a first Josephson junction and a second Josephson junction, and
a conductive member including a first terminal,
a signal generator configured to apply an electrical signal to the first terminal,
the electrical signal being input to the first terminal,
the electrical signal including a first signal in a first operation,
the first signal including
a first frequency component having a first frequency, and
a second frequency component having a second frequency,
the signal generator including
a first circuit configured to generate a first frequency signal of the first frequency,
a second circuit configured to generate a difference frequency signal of a frequency of a difference between the first frequency and the second frequency, and
a third circuit configured to mix the first frequency signal and the difference frequency signal.

Configuration 19
A calculating device, comprising:
a nonlinear oscillator including
a circuit part including a first Josephson junction and a second Josephson junction, and
a conductive member including a first terminal,
a signal generator configured to apply an electrical signal to the first terminal,
the electrical signal being input to the first terminal,
the electrical signal including a first signal in a first operation,
the first signal including
a first frequency component having a first frequency, and
a second frequency component having a second frequency,
the signal generator including a first circuit, a second circuit, and a third circuit,
the first circuit being configured to generate a first frequency signal of the first frequency,
the second circuit being configured to generate
a difference frequency signal of a frequency of a difference between the first frequency and the second frequency, and
a quadrature signal with respect to the difference frequency signal,
the third circuit being configured to mix the first frequency signal, the difference frequency signal, and the quadrature signal.

Configuration 20
The calculating device according to Configuration 2, wherein
the absolute value of the difference between the first frequency and the second frequency is not less than 16 times and not more than 24 times a frequency corresponding to a Kerr coefficient of the nonlinear oscillator.

Figure 11:
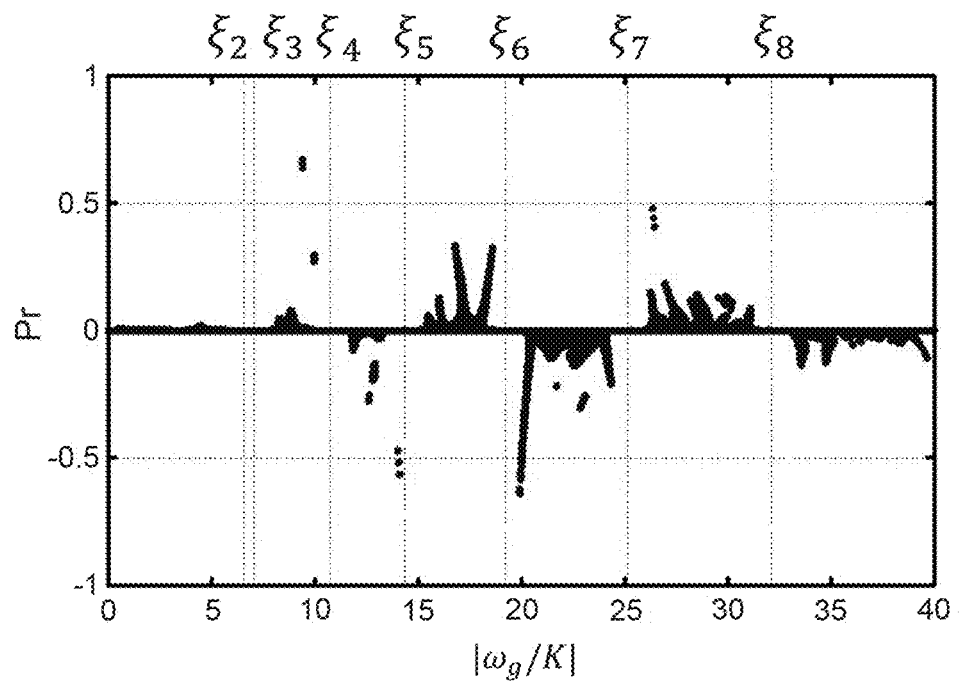
FIG. 11 is a graph illustrating a characteristic of the calculating device.

FIG. 11 is a graph illustrating a characteristic of the calculating device.

FIG. 11 illustrates results of the simulation of FIG. 10 that are performed in more detail. The horizontal axis of FIG. 11 is the ratio $|\omega_g/K|$. FIG. 11 shows the ratio $|\omega_g/K|$ in the range of 0 to 40. The vertical axis is the rotation phase Pr. The rotation phase Pr corresponds to $\theta/\pi$, wherein the rotation angle is $\theta$. In the example, the initial state is $(|E_0\rangle+|E_1\rangle)/2^{1/2}$ and substantially corresponds to $|\alpha\rangle$. The difference $\xi_n$ corresponds to $|E_n-E_0|/(hK/(2\pi))$. The difference $\xi_n$ corresponds to the frequency $\xi_n K/(2\pi)$. "h" is Planck's constant. $\xi_0$ and $\xi_1$ are 0. In the example of FIG. 11, p/K is 4; and $K \cdot T_g$ is 10.

As shown in FIG. 11, for example, rotations that correspond to the differences $\xi_2$ to $\xi_8$ occur. For example, in the ratio $|\omega_g/K|$ range that is not less than 16 and not more than 24, the rotation phase Pr continuously changes in the range from about −0.6 to about 0.4. For example, by setting the ratio $|\omega_g/K|$ to be substantially in the vicinity of the difference $\xi_6$, the rotation phase Pr continuously changes in the range from about −0.6 to about 0.4. The difference $\xi_6$ is $|E_6-E_0|/(hK/(2\pi))$. For example, by setting the ratio $|\omega_g/K|$ to be substantially the difference $\xi_6$, an X-rotation gate operation of the angle $\theta$ from 0 to $-\pi/2$ is obtained. In such an X-rotation gate operation Rx($\theta$), the fidelity F is greater than 0.999. Such characteristics are confirmed by FIG. 11 which is the result of a detailed simulation of FIG. 10.

Figure 12A:
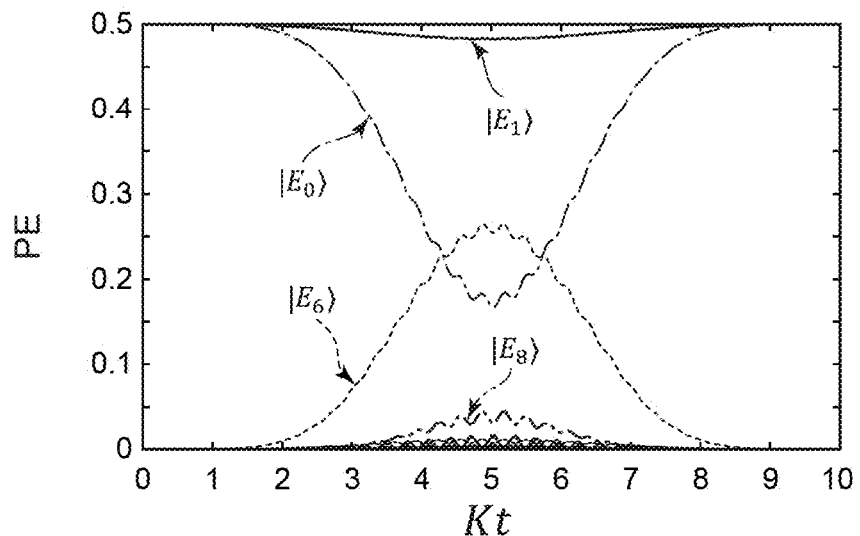
FIGS. 12A and 12B are schematic views illustrating the operation of the calculating device according to the first embodiment.
Figure 12B:
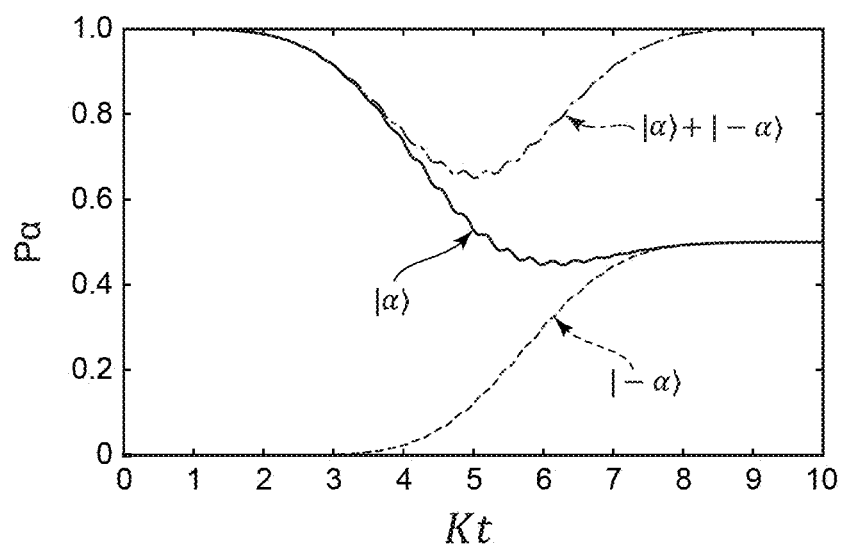

FIGS. 12A and 12B are schematic views illustrating the operation of the calculating device according to the first embodiment.

These figures illustrate characteristics of simulation conditions of FIG. 11. Namely, in the example, p/K is 4; and $K \cdot T_g$ is 10. In these figures, the horizontal axis is the time Kt. The vertical axis of FIG. 12A is the probability PE of each of the multiple eigenstates. The vertical axis of FIG. 12B is the probability P$\alpha$ of $|\alpha\rangle$, $|-\alpha\rangle$, and the sum of $|\alpha\rangle$ and $|-\alpha\rangle$. The ratio $|\omega_g/K|$ is 20 and is near 19.2 which is the value of $|E_6-E_0|/(hK/(2\pi))$.

As shown in FIG. 12A, a transition between ground and excited states (e.g., a transition between the energy $E_0$ and the energy $E_6$) can be utilized.

As shown in FIG. 12B, a transition from |α> to |−α> is possible. For example, the fidelity F is 0.99947 when the gate time K·$T_g$ is 10. θ/π is −0.50024. The X-rotation gate operation Rx(−π/2) is performed. $p_{gmax}$/K is 0.6845, wherein $p_{gmax}$ is the maximum value of the second frequency component. The second frequency component is the frequency fg (i.e., $\omega_g/(2\pi)$) component.

Thus, it is more favorable for the absolute value of the difference between the first frequency f1 and the second frequency f2 to correspond to a frequency that corresponds to the difference between the energy (e.g., the eigenenergy) of the ground state of the nonlinear oscillator 10 and the energy (e.g., the eigenenergy) of the sixth excited state. The frequency that corresponds to the energy difference corresponds to $|E_n - E_0|/h$.

According to the embodiment, for example, it is favorable for the absolute value of the difference between the first frequency f1 and the second frequency f2 to be, for example, not less than 5 times and not more than 30 times a frequency that corresponds to the Kerr coefficient K of the nonlinear oscillator 10. The frequency that corresponds to the Kerr coefficient K is $K/(2\pi)$. For example, as shown in FIGS. 10 and 11, a large rotation phase Pr is obtained with high fidelity when the absolute value of the difference ($\omega_g/(2\pi)$) between the first frequency f1 and the second frequency f2 is not less than 0 times (e.g., not less than 5 times) and not more than 30 times the frequency ($K/(2\pi)$) corresponding to the Kerr coefficient K. For example, it is favorable for the absolute value of the difference ($\omega_g/(2\pi)$) between the first frequency f1 and the second frequency f2 to be not less than 16 times and not more than 24 times the frequency ($K/(2\pi)$) corresponding to the Kerr coefficient K.

According to embodiments, a faster calculating device can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in calculating devices such as nonlinear oscillators, conductive members, signal generators, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all calculating devices practicable by an appropriate design modification by one skilled in the art based on the calculating devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A calculating device, comprising:
a nonlinear oscillator including
a circuit part including a first Josephson junction and a second Josephson junction, and
a conductive member including a first terminal,
an electrical signal being input to the first terminal,
the electrical signal including a first signal in a first operation,
the first signal including
a first frequency component having a first frequency, and
a second frequency component having a second frequency,
the first frequency being 2 times an oscillation frequency of the nonlinear oscillator,
an absolute value of a difference between the first frequency and the second frequency being not more than 0.3 times the first frequency.

2. The device according to claim 1, wherein
the absolute value of the difference between the first frequency and the second frequency is not more than 30 times a frequency corresponding to a Kerr coefficient of the nonlinear oscillator.

3. A calculating device, comprising:
a nonlinear oscillator including
a circuit part including a first Josephson junction and a second Josephson junction, and
a conductive member including a first terminal,
an electrical signal being input to the first terminal,
the electrical signal including a first signal in a first operation,
the first signal including
a first frequency component having a first frequency, and
a second frequency component having a second frequency,
the first frequency being 2 times an oscillation frequency of the nonlinear oscillator,
an absolute value of a difference between the first frequency and the second frequency being not more than 30 times a frequency corresponding to a Kerr coefficient of the nonlinear oscillator.

4. The device according to claim 1, wherein
the absolute value of the difference between the first frequency and the second frequency corresponds to a frequency corresponding to a difference between an energy of a ground state of the nonlinear oscillator and an energy of an excited state of the nonlinear oscillator.

5. A calculating device, comprising:
a nonlinear oscillator including
a circuit part including a first Josephson junction and a second Josephson junction, and
a conductive member including a first terminal,
an electrical signal being input to the first terminal,
the electrical signal including a first signal in a first operation,
the first signal including
a first frequency component having a first frequency, and
a second frequency component having a second frequency,
an absolute value of a difference between the first frequency and the second frequency corresponding to a frequency corresponding to a difference between an energy of a ground state of the nonlinear oscillator and an energy of an excited state of the nonlinear oscillator.

6. The device according to claim 1, wherein
the first frequency is 2 times the oscillation frequency of the nonlinear oscillator,
oscillation states of the nonlinear oscillator include a first oscillation state and a second oscillation state, and
a ratio of an occurrence probability of the first oscillation state to an occurrence probability of the second oscillation state changes according to the second frequency component in the first operation.

7. The device according to claim 1, wherein
the electrical signal includes a second signal in a second operation, and
the second signal includes the first frequency component.

8. The device according to claim 7, wherein
the first frequency is 2 times the oscillation frequency of the nonlinear oscillator,
oscillation states of the nonlinear oscillator include a first oscillation state and a second oscillation state, and
a ratio of an occurrence probability of the first oscillation state to an occurrence probability of the second oscillation state in the second operation is different from a ratio of an occurrence probability of the first oscillation state to an occurrence probability of the second oscillation state in the first operation.

9. The device according to claim 1, wherein
the electrical signal includes a third signal in a third operation,
the third signal includes
  the first frequency component, and
  a third frequency component having a third frequency, and
the third frequency is different from the second frequency.

10. The device according to claim 9, wherein
the first frequency is 2 times the oscillation frequency of the nonlinear oscillator,
oscillation states of the nonlinear oscillator include a first oscillation state and a second oscillation state, and
a ratio of an occurrence probability of the first oscillation state to an occurrence probability of the second oscillation state in the third operation is different from a ratio of an occurrence probability of the first oscillation state to an occurrence probability of the second oscillation state in the first operation.

11. The device according to claim 7, wherein
the electrical signal includes a third signal in a third operation,
the third signal includes
  the first frequency component, and
  a third frequency component having the second frequency, and
a magnitude of the third frequency component is different from a magnitude of the second frequency component.

12. The device according to claim 11, wherein
the first frequency is 2 times the oscillation frequency of the nonlinear oscillator,
oscillation states of the nonlinear oscillator include a first oscillation state and a second oscillation state, and
a ratio of an occurrence probability of the first oscillation state to an occurrence probability of the second oscillation state in the third operation is different from a ratio of an occurrence probability of the first oscillation state to an occurrence probability of the second oscillation state in the first operation.

13. The device according to claim 1, wherein
the second frequency is less than the first frequency.

14. The device according to claim 1, further comprising:
a signal generator configured to apply the electrical signal to the first terminal.

15. The device according to claim 14, wherein
the signal generator includes:
  a first circuit configured to generate a first frequency signal of the first frequency; and
  a second circuit configured to generate a second frequency signal of the second frequency.

16. The device according to claim 14, wherein
the signal generator includes:
  a first circuit configured to generate a first frequency signal of the first frequency;
  a second circuit configured to generate a difference frequency signal of a frequency of a difference between the first frequency and the second frequency; and
  a third circuit configured to mix the first frequency signal and the difference frequency signal.

17. The device according to claim 14, wherein
the signal generator includes a first circuit, a second circuit, and a third circuit,
the first circuit is configured to generate a first frequency signal of the first frequency,
the second circuit is configured to generate:
  a difference frequency signal of a frequency of a difference between the first frequency and the second frequency; and
  a quadrature signal with respect to the difference frequency signal, and
the third circuit is configured to mix the first frequency signal, the difference frequency signal, and the quadrature signal.

18. The device according to claim 2, wherein
the absolute value of the difference between the first frequency and the second frequency is not less than 16 times and not more than 24 times a frequency corresponding to a Kerr coefficient of the nonlinear oscillator.

* * * * *